(12) United States Patent
Gao et al.

(10) Patent No.: US 7,996,211 B2
(45) Date of Patent: *Aug. 9, 2011

(54) METHOD AND APPARATUS FOR FAST SEMI-AUTOMATIC SEMANTIC ANNOTATION

(75) Inventors: Yuqing Gao, Mount Kisco, NY (US); Michael Alan Picheny, White Plains, NY (US); Ruhi Sarikaya, Shrub Oak, NY (US)

(73) Assignee: Nuance Communications, Inc., Burlington, MA (US)

( * ) Notice: Subject to any disclaimer, the term of this patent is extended or adjusted under 35 U.S.C. 154(b) by 475 days.

This patent is subject to a terminal disclaimer.

(21) Appl. No.: 12/123,778

(22) Filed: May 20, 2008

(65) Prior Publication Data

US 2008/0221874 A1    Sep. 11, 2008

Related U.S. Application Data

(63) Continuation of application No. 10/959,523, filed on Oct. 6, 2004, now Pat. No. 7,610,191.

(51) Int. Cl.
*G06F 17/27*    (2006.01)

(52) U.S. Cl. ......... 704/9; 704/7; 704/8; 704/10
(58) Field of Classification Search .......... None
See application file for complete search history.

(56) References Cited

U.S. PATENT DOCUMENTS

| | | | |
|---|---|---|---|
| 6,167,398 A * | 12/2000 | Wyard et al. ............ 1/1 |
| 6,609,087 B1 * | 8/2003 | Miller et al. ............ 703/22 |
| 6,970,860 B1 * | 11/2005 | Liu et al. ............ 1/1 |
| 2003/0212544 A1 * | 11/2003 | Acero et al. ............ 704/9 |
| 2005/0154979 A1 * | 7/2005 | Chidlovskii et al. ........ 715/513 |
| 2005/0256700 A1 * | 11/2005 | Moldovan et al. ............ 704/9 |

* cited by examiner

Primary Examiner — Leonard Saint Cyr
(74) Attorney, Agent, or Firm — Wolf, Greenfield & Sacks, P.C.

(57) ABSTRACT

A method, apparatus and computer instructions is provided for fast semi-automatic semantic annotation. Given a limited annotated corpus, the present invention assigns a tag and a label to each word of the next limited annotated corpus using a parser engine, a similarity engine, and a SVM engine. A rover then combines the parse trees from the three engines and annotates the next chunk of limited annotated corpus with confidence, such that the efforts required for human annotation is reduced.

26 Claims, 4 Drawing Sheets

METHOD AND APPARATUS FOR FAST SEMI-AUTOMATIC SEMANTIC ANNOTATION

This application is a continuation of application Ser. No. 10/959,523, filed Oct. 6, 2004, status pending.

BACKGROUND OF THE INVENTION

1. Technical Field

The present invention relates to an improved data processing system. In particular, the present invention relates to using fast semi-automatic semantic annotation to train initial parser in a data processing system. Still more particularly, the present invention relates to using fast semi-automatic semantic annotation to train initial parser in a statistical spoken dialog system or statistical text processing system.

2. Description of Related Art

A natural language understanding system is a media or tool which facilitates communications between human and machine. For example, part of a natural language understanding system, such as a statistical spoken dialog system, includes conversations between two people and a collection of sentences necessary for a conversation. From these conversations, real application data may be collected.

Currently, two main approaches in building natural language understanding systems are present. These approaches are grammar-based approach and corpus-driven approach. The grammar based approach requires either a grammarian or a domain expert to handcraft a set of grammar rules. These grammar rules capture the domain specific knowledge, pragmatics, syntax and semantics. The corpus-driven approach employs statistical methods to model the syntactic and semantic structure of sentences. The task of defining grammar rules is replaced by a simpler task of annotating the meaning of a set of sentences. This approach is more desirable, because induced grammar can model real data closely. Some grammar induction algorithms can automatically capture patterns in which syntactic structures and semantic categories interleave into a multitude of surface forms. In building natural language understanding systems, collection of a "mini-corpus" of 10000 to 15000 sentences is a necessary step using either the grammar-based approach or the corpus-driven approach.

SUMMARY OF THE INVENTION

The exemplary embodiments of the present invention provide a method, apparatus and computer instructions for fast semi-automatic semantic annotation. The exemplary embodiments of the present invention capture language structures given a limited annotated corpus. Using a decision tree parser, a similarity measure, and a support vector machines (SVM) classifier, each word of a first set of sentences is assigned a set of tags, labels, and connections. Given a second set of sentences, a rover then combines the parse trees and tags the sentences that are and are not likely to be corrected by human annotator.

The exemplary embodiments of the present invention provide at least an improved method that expedites the "mini-corpus" annotation step for both grammar-based and corpus-driven approach. This improved method has advantages over the prior art at least in that current approaches give little attention to rapid annotation of the "mini-corpus," which is crucial in improving annotation speed.

BRIEF DESCRIPTION OF THE DRAWINGS

The exemplary aspects of the present invention will best be understood by reference to the following detailed description when read in conjunction with the accompanying drawings, wherein.

DETAILED DESCRIPTION OF THE PREFERRED EMBODIMENT

Figure 1:
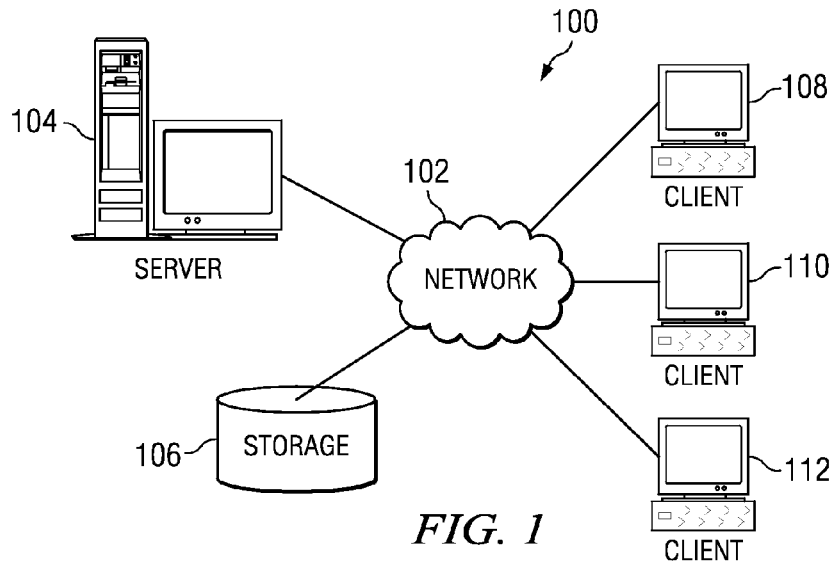
FIG. 1 is a pictorial representation of a network of data processing systems in which exemplary aspects of the present invention may be implemented.

With reference now to the figures, FIG. 1 depicts a pictorial representation of a network of data processing systems in which exemplary aspects of the present invention may be implemented. Network data processing system 100 is a network of computers in which the exemplary aspects of the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
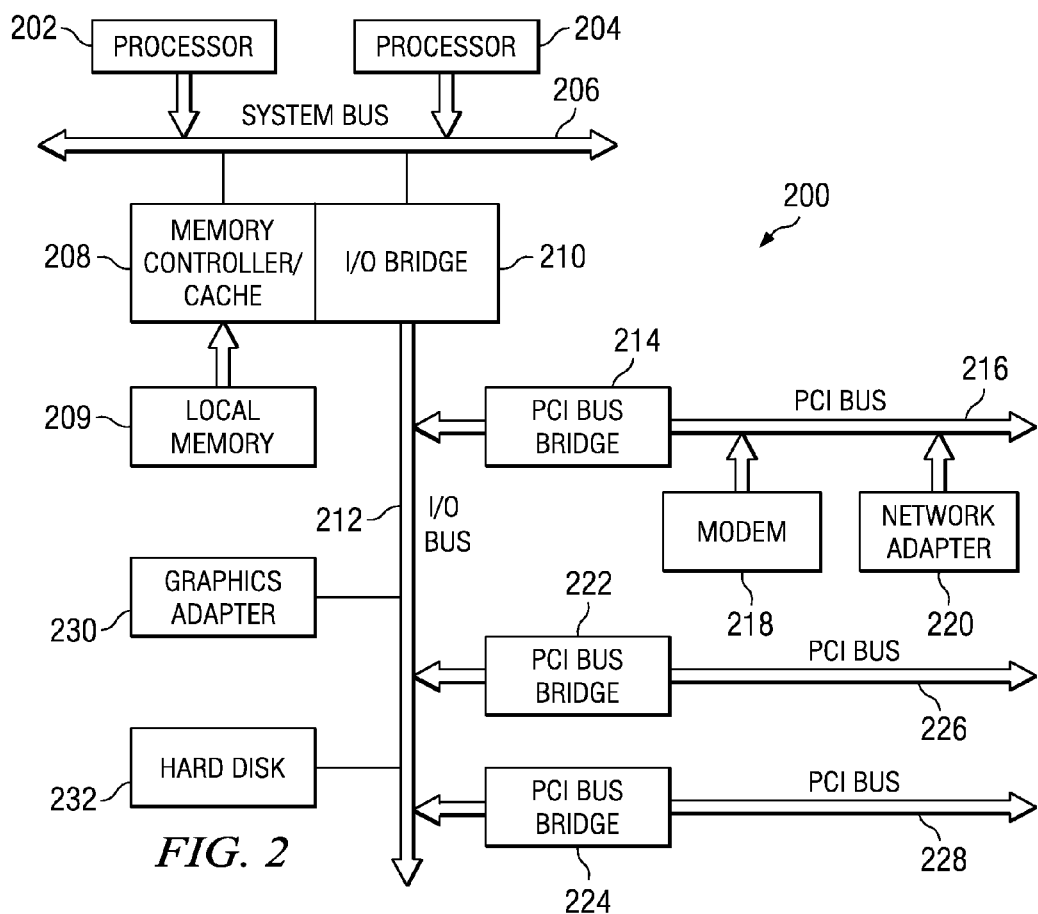
FIG. 2 is an exemplary block diagram of data processing system that may be implemented as a server in accordance with exemplary aspects of the present invention.

Referring to FIG. 2, an exemplary block diagram of data processing system that may be implemented as a server, such as server 104 in FIG. 1, is depicted in accordance with exemplary aspects of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
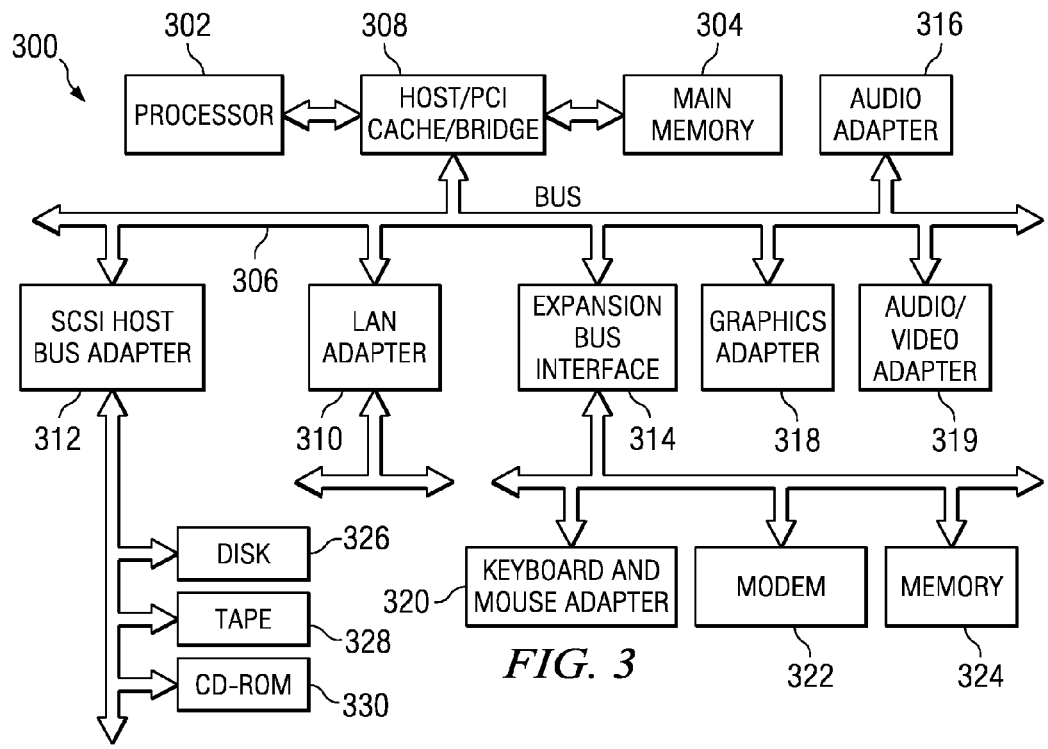
FIG. 3 is an exemplary block diagram illustrating a data processing system in which exemplary aspects of the present invention may be implemented.

With reference now to FIG. 3, an exemplary block diagram illustrating a data processing system is depicted in which exemplary aspects of the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

In the grammar based approach, it is often difficult to write a set of grammar rules that has good coverage of real data without becoming intractable. On the other hand, the corpus-driven approach requires manual annotation of data, which is a time consuming and costly task in developing a natural language understanding system. This is due to a significant amount of time being spent in manually annotating the dialog and validating the annotated data. In addition, time and financial resources are often limited in deploying natural language understanding systems, which makes the speed of building such systems a priority. Current parser-based systems fail to fully exploit the limited amount of manually annotated data to minimize annotation time for the rest of the much large data to be annotated. Furthermore, building different natural language understanding systems involve annotating data in different domains.

The present invention provides a method, apparatus and computer instructions for fast semi-automatic semantic annotation. The present invention devises a semi-automatic annotation methodology to capture language structures given a limited manually annotated corpus, or a "mini corpus." A "mini-corpus" is a set of sentences in the unit of 10000 to 15000 sentences. A "mini-corpus" may further be divided into chunks of sentences, such as 1000 or 2000 sentences.

The present invention uses a baseline decision tree parser, a similarity measure and a set of support vector machines (SVM) based classifiers to perform training on the "mini-corpus" and generates a unique set of semantic tags, labels, and connections for each word of the sentences in the "mini-corpus." Training is learning the structure of the sentences. The structure of the sentences may be a parse tree comprising a set of tags, labels and connections for each word of the sentences. The parse tree itself is generated by human using an annotation tool for the first chunk of the mini-corpus. The baseline decision tree parser, the similarity measure, and the set of support vector machines may also be known as trainers. Trainers are mechanisms that learn semantic structures of the sentences from the annotated data to build models. The resulting models are used in the corresponding engines, which are used to predict the semantic structure of new sentences.

Once the unique set of tags, labels, connections and parse trees are generated for each trainer, new parser parameters are generated from the unique set of tags, labels, and connections. The parse trees are fed, in these illustrative examples, into a triple annotation engine, where the next chunk of "mini-corpus" is analyzed. The triple annotation engine includes an engine for each of the three trainers. The triple annotation engine takes models generated by the trainers, and annotates the next chunk of "mini-corpus." The triple annotation engine is used in a rover scheme to assign a best possible tag, label, and connections to each word of the sentences in the next chunk of "mini-corpus."

The rover combines the parse trees of the three engines and annotates sentences from the next chunk of "mini-corpus" using the best possible tags, labels and connections. Annotated sentences that are likely to be corrected by the human annotator are tagged as unreliable and annotated sentences that are not likely to be corrected by the human annotator are tagged as reliable. Sentences that are tagged unreliable, or less-confident sentences, are forwarded to the human annotator for inspection. Correctly annotated sentences, or high-confident sentences, are forwarded back to the annotation tool to be used as training data for the next round of incremental annotation.

Figure 4:
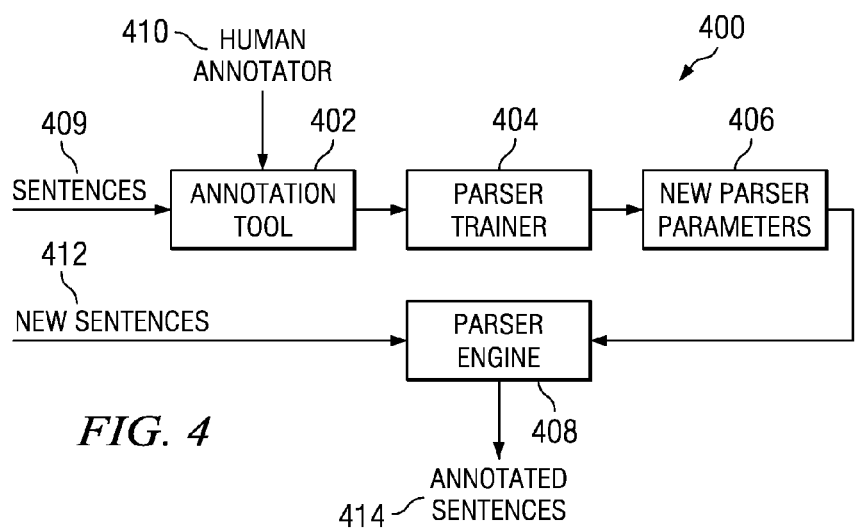
FIG. 4 is a diagram illustrating a current annotation framework in accordance with the prior art.

Turning now to FIG. 4, a diagram illustrating a current annotation framework is depicted in accordance with the prior art. As depicted in FIG. 4, current annotation framework 400 may be implemented in a natural language understanding system residing on a data processing system, such as data processing system 200 in FIG. 2 or data processing system 300 in FIG. 3. Current annotation framework 400 includes annotation tool 402, parser trainer 404, new parser parameters 406, and a parser engine 408. Parser trainer 404 is a decision tree-based statistical parser that is trained using manually annotated data. Training here refers to learning the structure of the sentences in the manually annotated data. The manually annotated data includes sentences 409 that are annotated manually by human annotator 410, such as a domain expert, using annotation tool 402.

The performance of parser engine depends heavily on the amount of manually annotated data. Given a large amount of training data, parser engine 408 likely generates a complete parse tree for most of the sentences representing the structure of the sentences. In addition, since the design of parser trainer 404 is based on large amount of manually annotated data, little work has been done to determine how parser trainer 404 would behave under extreme cases, such as when the size of the training data is drastically reduced.

Lack of training data adversely affects the robustness of parser engine 408, because, during bootstrap annotation, parser engine 408 attempts to predict the best parse tree for new sentences 412 given what it learned from the learned training data or new parser parameters 406. However, new parser parameters 406, generated by parser trainer 404, may only cover some or most of the new sentences 412. For example, parser engine 408 may fail to parse 36% of new sentences given a training data size of 1000 sentences, 23.5% of new sentences given a training data size of 2000 sentences, 14.7% of new sentences given a training data size of 3000 sentences, and 5.4% of new sentences given a training data size of 9000 sentences.

Due to the insufficient training data, parser engine 408 fails to generate a complete parse tree during the automatic annotation of new sentences. Furthermore, there is no confidence mechanism in current annotation framework 400 for annotated sentences 414. A human annotator has to check each and every unique annotated sentence 414 generated by parser engine 408 even though some or no corrections are required.

The present invention formulates the above automatic annotation problem as a classification problem and provides a framework for fast semi-automatic semantic annotation. The framework uses a baseline decision tree statistical parser, such as parser trainer 404 in FIG. 4, to extract meaning from an utterance. An utterance is a natural unit of speech bounded by breaths or pauses. The objective of parser engine 408 is to fit a complete parse tree to a given sentence. Parser engine 408 works in a left-to-right and a bottom-up fashion.

Figure 5:
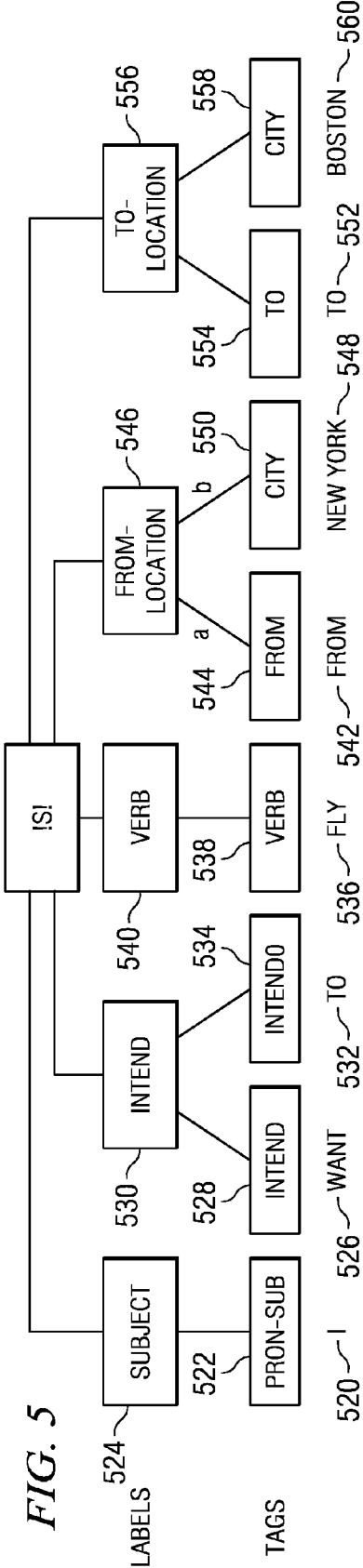
FIG. 5 is a diagram illustrating an example of semantically annotated sentence or a parse tree in accordance with exemplary aspects of the present invention.

Turning now to FIG. 5, a diagram illustrating an example of semantically annotated sentence or a parse tree is depicted in accordance with exemplary aspects of the present invention. As depicted in FIG. 5, for this example sentence 'I want to fly from New York to Boston,' parser trainer 404 in FIG. 4 first attempts to predict a tag for 'I' 520, which is 'Pron-sub' 522. Next, parser trainer 504 predicts a label for tag 'Pron-sub' 522. A label is a more generic description of one or more tags. In this example, the label assigned for 'Pron-sub' 522 is 'SUBJECT' 524. After the tag and label for 'I' 520 is predicted, parser engine 408 parses the next word to the right of 'I' 520, which is the word 'want' 526. In this example, 'want' 526 is assigned a tag of 'intend' 528 and a label of 'INTEND' 530. Similarly, the word to the right of 'want' 526 is 'to' 532, which is assigned a tag of 'intend0' 534 and the same label 'INTEND' 530. The word 'fly' 536 is assigned a tag of 'verb' 538 and a label of 'VERB' 540.

The word 'from' 542 is assigned a tag of 'from' 544 and a label of 'FROM-LOCATION' 546, while the word 'New York' 548 is assigned a tag of 'city' 550 since it represents a city, and the same label 'FROM-LOCATION' 546. 'FROM-LOCATION' 546 is assigned, because it gives a more generic description for tags 'from' 544 and 'city' 550. Likewise, parser engine 408 assigns a tag of 'to' 554 for the word 'to' 552 and a tag of 'city' 558 to the word 'Boston' 560, since it represents a city. Both 'to' 554 and 'city' 558 share a common label of 'TO-LOCATION' 556.

Also shown in FIG. 5, each tag is connected to a label with a connection. For example, tags 'from' 544 and 'city' 550 are connected to 'FROM-LOCATION' 546 with connections 'a' and 'b'. As mentioned above, when the training data is limited, the parser trainer may not see some or most of the words in the sentences. Thus, human correction is still required to verify the sentence structure, including tags, labels and connections, which is a time consuming and costly task.

Based on the above constraints, in addition to the baseline decision tree based parser, the present invention uses two new classification-based schemes to solve the annotation problem: similarity-based annotation and multi-class classification for annotation. Similarity-based annotation is a method that is based on example-based learning, which requires training data, but does not require training.

When dealing with limited domains, such as the medical domain, it is likely that most of the words are used only for one meaning. For example, while the word 'English' has several meaning, including language, person or discipline, only one of these meanings is likely to be used in the limited domain. However, there might be cases in which a word takes on several meanings in a given domain. Hence, the word is assigned a different tag and label. The similarity-based annotation is based on the premise that given two instances of a word, if the context in which they are used is similar, the two instances should be annotated with the same tag and labels.

Inspired by the resemblance of annotation problem and machine translation (MT) evaluation where a translated or candidate sentence is compared to a set of reference sentences, the present invention adopts the bilingual evaluation under study (BLEU) as the similarity measure for annotation in these illustrative examples. BLEU is a fully automatic evaluation metric that provides an alternative to the costly and time-consuming human judgment of translation quality. The BLEU metric is defined as follows:

$$BLEU = BP \cdot \exp\left(\sum_{n=1}^{N} w_n \log p_n\right)$$

N is the maximum n-gram length, $w_n$ and $p_n$ are the corresponding weight and precision. BP is the brevity penalty, which is defined as:

$$BP = \begin{cases} 1 & \text{if } c > r \\ \exp(1 - r/c) & \text{if } c \leq r \end{cases}$$

r is the length of the reference sentence and c is the length of the candidate sentence. Since the objective is to annotate words of the sentences, rather than determining how close two sentences are to each other. The present invention tailors the BLEU metric based on the similarities between MT evaluation and annotation. Thus, the sentence to be annotated is treated as the candidate sentence and all the sentences in the training data containing the word to be annotated are possible reference sentences. Using a BLEU score, the best reference sentence is determined.

In the processing of determining a best reference sentence, a training sentence becomes a reference sentence when the most relevant segment of the training sentence is extracted with the purpose of having similar left and right context size of the word to be annotated. Thus, the reference sentence may be truncated if the context to either side of the word to be annotated is larger than corresponding sizes of the candidate sentence. The annotation is performed sequentially for each word of the candidate sentence and the best reference sentence changes for each word of the candidate sentence.

Once a best reference sentence that contains the word to be annotated is determined, the tag, label and connections of that word is used as the tag and label for the current word. If there is no reference sentence that contains the current word, the tags, labels, and connections are selected based on the priors.

Another new classification-based scheme used by the present invention, in these illustrative examples, to solve the annotation problem is multi-class classification annotation. Any standard machine learning method, including Maximum Entropy and Support Vector Machine (SVM) may be used to train a classifier. The present invention uses SVM as the learning method to build a set of classifiers, although other learning methods may be used. Although SVM builds binary classifiers, a multi-class classification problem may be performed using pairwise binary classifiers. Thus, one may train N(N−1)/2 pairwise binary classifiers, where N is the number of classes.

Using multi-class classification annotation, the most important step is the relevant feature selection, where features from a context surrounding the word to be annotated are derived. In the present invention, there are two analysis levels: a tag level and a label level. The classification scheme is sequential, meaning that the tag of a word is first determined using a tag SVM classifier. The tag SVM classifier is built using the following tag feature vector, $f_{tag}{}^i$, for the ith word, $w_i$:

$$f_{tag}{}^i = [w_{i-2} w_{i-1} w_i w_{i+1} w_{i+2} t_{i-2} t_{i-1} l_{i-2} l_{i-1}]$$

$w_i$ is the word to be tagged, $t_{i-1}$ and $l_{i-1}$ are the tag and label of the previous word, $W_{i-1}$, respectively. In addition to word context, tags and labels of the previous words are also used. Next, given the predicted tag, $\hat{t}_i$, a label feature vector is used to predict the label for $w_i$ using a separate label SVM model:

$$f_{label}{}^i = [w_{i-2} w_{i-1} w_i w_{i+1} w_{i+2} t_{i-2} t_{i-1} \hat{t}_i l_{i-2} l_{i-1}]$$

Once the label, $l_i$, for $w_i$ is determined, then $t_{i+1}$ and $l_{i+1}$ are predicted sequentially. In the present invention, the number of classes for tag and label for a particular domain are determined to be 158 and 69, respectively. Thus, there is a set of 158 possible tags and a set of 69 possible labels for a given domain.

The flexibility and classification power of SVM resides in the choice of the kernel. Kernels may be linear, polynomial, or radial basis functions. In the present invention, linear kernels are used to train the SVM.

Figure 6:
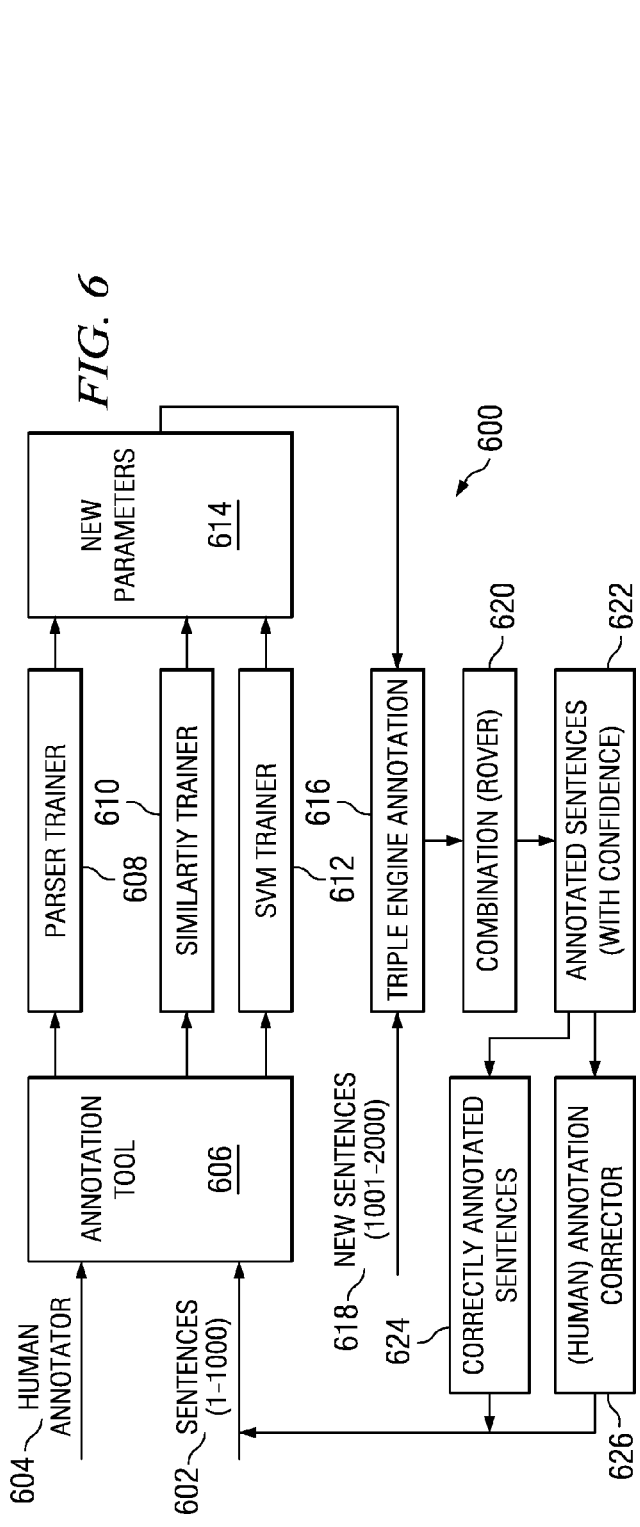
FIG. 6 is a diagram illustrating an exemplary annotation framework for fast semi-automatic semantic annotation in accordance with exemplary aspects of the present invention.

Turning now to FIG. 6, a diagram illustrating an exemplary annotation framework for fast semi-automatic semantic annotation is depicted in accordance with exemplary aspects of the present invention. As depicted in FIG. 6, annotation framework 600 may be implemented in a natural language understanding system residing on a data processing system, such as data processing system 200 in FIG. 2 or data processing system 300 in FIG. 3. Annotation framework 600 may also be implemented using a graphical user interface, with which a user may interact with to perform semantic annotation.

In exemplary annotation framework 600, the first 1000 sentences 602 are manually annotated by human annotator 604 using annotation tool 606. The manually annotated sentences are fed into the three trainers: parser trainer 608, similarity trainer 610, and SVM trainer 612.

Parser trainer 608 is a decision tree-based statistical parser trainer as described in FIG. 4. Similarity trainer 610 uses a BLEU score to determine a best reference sentence and based on the best reference sentence, a set of best referenced tags and labels of the words in sentences 602 are derived. SVM trainer 612 uses a tag SVM classifier to predict a tag of a word. Given a predicted tag, the label of the word also is predicted. Sequentially, all the tags and labels of sentences 602 are predicted.

Using a set of tags and labels annotated by human annotator 604 using annotation tool 606, new parser, SVM, and similarity parameters 614 are generated for the three trainers. Triple annotation engine 616 includes three engines, each of which corresponds to each of the three trainers. The three engines then use new parameters to perform triple engine annotations. Triple annotation engine 616 sends the next 1000 sentences 618 or the next chunk of "mini-corpus" and the parse trees from the three engines to combination rover 620. Combination rover 620 estimates annotation sentences based on the combination of the parse trees from the three engines.

If all three engines agree on a given parse tree, then only that parse tree with the unique set of tags, labels, and connections is used to annotate sentences 618. If parser engine and similarity engine agree on a given parse tree, but SVM engine disagrees, the agreed parse tree with the unique set of tags, label, and connection is used to annotate sentences 618. If all three engines disagree, then the parse tree generated by SVM trainer 612 with the unique set of tags, labels, and connections, is used to annotate sentences 618. SVM trainer 612 is the best of the three trainers in annotation accuracy and reduction in cost and time. At any time when SVM engine agrees with a given parse tree and the other engine disagrees, the parse tree generated by SVM trainer 612 with the unique set of tags, labels, and connections is used.

Based on the agreement of the three engines, each sentence of sentences 618 is tagged as reliable or unreliable. If all three engines agree, the sentence is tagged as reliable. Otherwise, it is tagged as unreliable. Thus, annotated sentences are generated with confidence 622. Sentences that are tagged reliable 624 or high confidence sentences do not have to be inspected by the human annotator for accuracy and may be used as training data for the next chunk of "mini-corpus." Thus, instead of having only 1000 sentences as training data, the next round of annotation may have 1500 sentences (initial 1000 sentences+500 accurately annotated sentences) as training data. As to sentences that are tagged as unreliable or low confidence sentences, they are forwarded to human annotation 626 to be inspected. Once they are inspected and corrected by human annotation 626, these annotated sentences may also be used as training data for the next round of annotation.

Figure 7A:
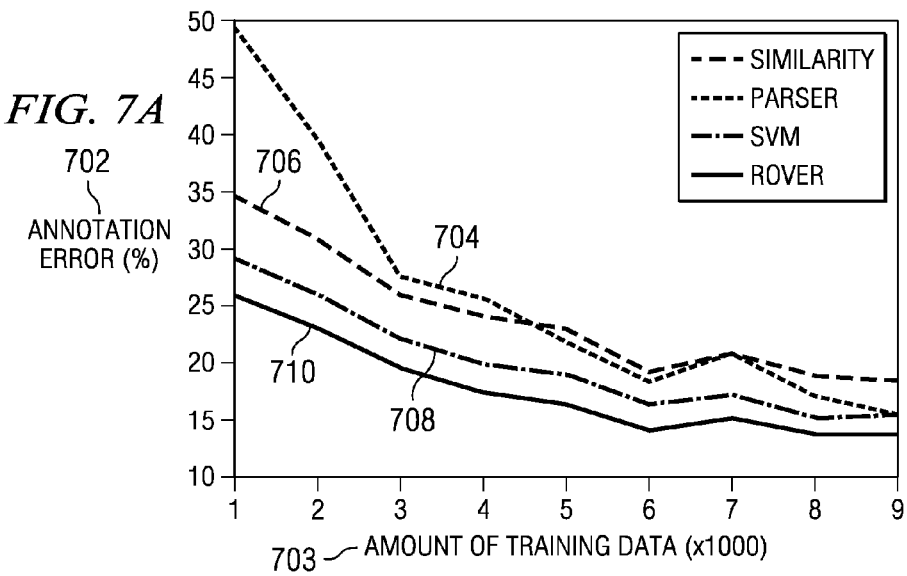
FIG. 7A is a diagram illustrating exemplary comparisons of annotation error rates between parser, similarity and SVM-based annotation schemes for an 'incremental' test set in accordance with exemplary aspects of the present invention.

Turning now to FIG. 7A, a diagram illustrating exemplary comparisons of annotation error rates between parser, similarity and SVM-based annotation schemes for an 'incremental' test set is depicted in accordance with exemplary aspects of the present invention. As depicted in FIG. 7A, a data set of 10000 sentences manually annotated sentences in the medical domain is used as the input to each of the three trainers. The 10000 sentences are divided into 10 equal sets of 1000 sentences. The first 1000 sentences are used as training data and the second 1000 sentences are to be annotated. The process then repeats until 9000 sentences are used as training data and the last 1000 sentences are to be annotated. Thus, an 'incremental' test set changes at each step of the annotation.

Annotation error rate (AER) 702 is used as a measure of the percentage of tags and labels that needs to be corrected by the human annotator. This includes inaccurate tags, labels, and connections between tags and labels. Annotation error rate 702 is measured against the amount of training data available in the unit of 1000 sentences. Parser-based method 704 is used as the baseline for comparison with similarity measure 706, SVM-based annotation 708, and combination rover 710.

As shown in FIG. 7A, similarity measure 706 provides a lower annotation error rate than parser-based method 704 up to a training data size of 4000 sentences. Parser-based method 704 outperforms similarity measure 706 when the training data size is larger than 7000 sentences. Comparing SVM-based annotation 708 and other schemes, SVM-based annotation 708 outperforms both parser-based method 704 and similarity measure 706. However, the performance of parser-based method 704 catches up with SVM-based annotation 708 when the training data size reaches 9000 sentences. Combination rover 710 outperforms all other methods across all data sizes.

Figure 7B:
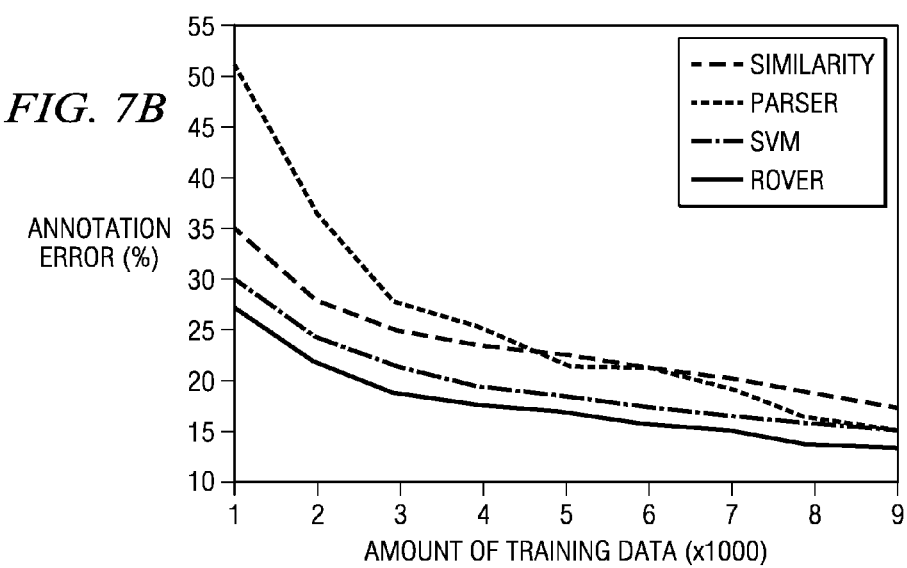
FIG. 7B is a diagram illustrating exemplary comparisons of annotation error rates between parser, similarity and SVM-based annotation schemes for a 'fixed' test set in accordance with exemplary aspects of the present invention.

Turning now to FIG. 7B, a diagram illustrating exemplary comparisons of annotation error rates between parser, similarity and SVM-based annotation schemes for a 'fixed' test set is depicted in accordance with exemplary aspects of the present invention. Unlike 'incremental' evaluation, a 'fixed' evaluation is a scenario where the last 1000 sentences of the data set is kept separate from the rest of the data set and the training data is increased incrementally from 1000 to 9000 sentences in the unit of 1000 sentences.

As shown in FIG. 7B, similar observations hold where the same methods are compared for the 'fixed' test set. Thus, using SVM-based classification before manual annotation of the next chunk of "mini-corpus" provides significant savings in annotation time and cost.

Figure 8:
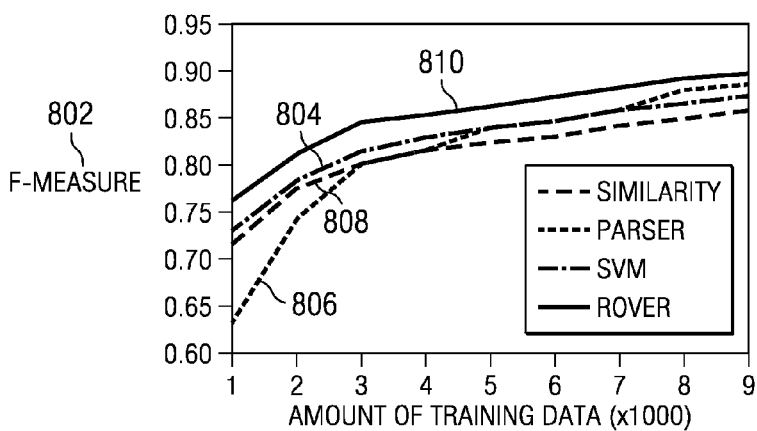
FIG. 8 is a diagram illustrating exemplary comparisons of F-measures between parser, similarity and SVM-based annotation schemes for a 'fixed' test set in accordance with exemplary aspects of the present invention.

Turning now to FIG. 8, a diagram illustrating exemplary comparisons of F-measures between parser, similarity and SVM-based annotation schemes for a 'fixed' test set is depicted in accordance with exemplary aspects of the present invention. As depicted in FIG. 8, F-measure 802 is a widely used measure for performance evaluation of parsers. The higher the F-measure, the better the performance. In this example, for both 'fixed' and 'incremental' test sets, SVM-based annotation 804 (illustrated by a dotted line) has a higher F-measure than parser-based method 806 up to 4000 to 5000 sentences. They have similar scores up to 6000 to 7000 sentences and then parser-based method 806 starts to outperform SVM-based annotation 804 from 7000 to 9000 sentences. Also shown in FIG. 8, similarity measure 808 outperforms parser-based method 806 up to 3000 sentences. Combination rover 810 outperforms all other methods all the way.

When comparing F-measure results in FIG. 8 with annotation error rates in FIGS. 7A and 7B, it shows that improvements in annotation accuracy are significantly better than corresponding improvements in F-measures. This is because precision scores are artificially high for the parse-based method, since the parser fails to generate complete parse trees for a relatively high percentage of sentences when training data is very small. However, if the parser generates an output, it is likely to be correct. Therefore, if the data to be annotated is more than "mini-corpus" size, i.e. 10000 sentences, first using the SVM-based classification method for the incremental annotation and then switching to the parser-based scheme is a reasonable strategy. However, if all three methods are available, using the combination rover is the best option.

Thus, based on observations from FIGS. 7A, 7B, and 8, similarity measure outperforms parse-based method up to a corpus size of 5000 sentences. SVM-based annotation shows significant performance over the parser-based method in annotation accuracy, reduction in cost and time, for up to a corpus size of 9000 sentences. Combination rover produces further performance improvement.

In summary, the present invention provides a fast semi-automatic semantic annotation method and apparatus that has advantages over the prior art. These advantages include savings in the number of inaccurate annotated sentences that need to be corrected by human annotator and the number of mistakes within the annotated sentences to be corrected by human annotator.

With the incremental increase in the amount of training data for each round of annotation, the parser learns more and makes fewer mistakes in annotation each time. As a result, safer parse trees are generated from the three trainers, which contribute to a higher number of correctly annotated sentences. This minimizes the time and cost of human annotation required for inspecting and correcting annotated sentences.

In addition, with the use of the similarity measure and SVM-based classification, the annotation error rates are lower than the baseline parser-based method. This also contributes to fewer annotated sentences to be corrected by the human annotator. Furthermore, the present invention minimizes the reliance on the amount of annotated data for reasonable performance, and takes full advantage of limited annotated data (a few thousand sentences). Moreover, the present invention may be used in both grammar-based and corpus-based frameworks as well as easy to implement.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
    training a plurality of sentence annotation models, via a computer, on a corpus of annotated sentences, wherein each sentence annotation model of the plurality of sentence annotation models uses a different sentence annotation algorithm;
    with the computer, applying each of the plurality of sentence annotation models to a first sentence not included in the corpus of annotated sentences, to generate a plurality of sentence annotations, each of the plurality of sentence annotations resulting from application of one of the plurality of sentence annotation models to the first sentence, each of the plurality of sentence annotations comprising a parse tree that includes a set of tags, labels, and/or connections for words of the first sentence; and
    comparing the plurality of sentence annotations to select a best sentence annotation for the first sentence from among the plurality of sentence annotations, wherein the comparing comprises:
        sending the parse tree resulting from application of each of the plurality of sentence annotation models to a rover;
        determining in the rover a best set of tags, labels, and/or connections for the first sentence based on a comparison of the sets of tags, labels, and/or connections resulting from application of the plurality of sentence annotation models;
        annotating words of the first sentence using the best set of tags, labels, and/or connections; and
        tagging the best set of tags, labels, and/or connections as reliable or unreliable.

2. The method of claim 1, wherein the best sentence annotation comprises a parse tree that includes a tag, a label, and connections for each word of the first sentence.

3. The method of claim 1, wherein the corpus comprises sentences annotated by a human annotator using an annotation tool.

4. The method of claim 1, wherein the plurality of sentence annotation models includes a parser model, a similarity model, and a support vector machines model.

5. The method of claim 4, wherein the parser model is a decision tree-based statistical parser and wherein the parser model fits a complete parse tree to each sentence of the corpus.

6. The method of claim 4, wherein the similarity model determines a tag, a label, and connections of a word to be annotated by:
    finding a best reference sentence containing the word to be annotated using a bilingual evaluation understudy score; and
    assigning corresponding tag, label, and connections of the word in the best reference sentence as the tag, the label, and the connections of the word to be annotated.

7. The method of claim 4, wherein the support vector machines engine determines a tag and a label of a word to be annotated by:
    determining the tag of the word using a tag classifier built using a tag feature vector for the word; and
    determining the label of the word using the determined tag and a label feature vector for the word.

8. The method of claim 1, wherein the determining comprises:
    determining whether any of the plurality of sentence annotation models agree on a same parse tree; and
    if any of the plurality of sentence annotation models agree on the same parse tree, selecting the set of tags, labels, and/or connections resulting from application of one of the agreed sentence annotation models as the best set of tags, labels, and/or connections.

9. The method of claim 8, wherein the determining further comprises:
    determining whether a parser model and a similarity model agree on a same parse tree; and
    if the parser model and the similarity model agree on the same parse tree, selecting the set of tags, labels, and/or connections resulting from application of the parser model or the similarity model as the best set of tags, labels, and/or connections.

10. The method of claim 8, wherein the determining further comprises:
    if none of the plurality of sentence annotation models agree on a same parse tree, selecting a set of tags, labels and/or connections resulting from application of a support vector machines model as the best set of tags, labels, and/or connections.

11. The method of claim 1, wherein the tagging comprises:
    determining whether the plurality of sentence annotation models agree on a same parse tree for the first sentence;
    if the plurality of sentence annotation models agree on the same parse tree, tagging the best set of tags, labels, and/or connections as reliable; and
    if the plurality of sentence annotation models disagree on the same parse tree, tagging the best set of tags, labels, and/or connections as unreliable.

12. The method of claim 1, further comprising:
adding the best sentence annotation in association with the first sentence to a set of training data that includes sentences annotated by a human annotator; and
annotating a second sentence using the set of training data.

13. The method of claim 12, further comprising:
automatically annotating each sentence of subsequent corpuses using a set of training data that includes correctly annotated sentences from at least one previous round of annotation.

14. At least one recordable-type computer-readable medium encoded with a plurality of processor-executable instructions that, when executed by at least one processor, cause the at least one processor to implement:
an annotation tool capable of being used by a human annotator to manually annotate a first corpus of sentences;
a similarity trainer, a support vector machine trainer and a decision tree-based parser trainer that each generate a parse tree for each sentence of the first corpus of sentences, the parse tree comprising a tag, a label, and/or connections for words of the respective sentence;
a triple annotation engine that receives a second corpus of sentences and the parse trees generated; and
a combination rover that determines a best set of tags, labels, and/or connections for each sentence of the second corpus of sentences based on a comparison of the parse trees generated by the similarity trainer, the support vector machine trainer and the decision tree-based parser trainer, annotates words of each sentence of the second corpus of sentences based on the best set of tags, labels, and/or connections determined for the respective sentence, and tags the best set of tags, labels, and/or connections for the respective sentence as reliable or unreliable.

15. A data processing system comprising:
a memory storing processor-executable instructions; and
at least one processor that, upon execution of the processor-executable instructions, performs a method comprising:
training a plurality of sentence annotation models on a corpus of annotated sentences, wherein each sentence annotation model of the plurality of sentence annotation models uses a different sentence annotation algorithm;
applying each of the plurality of sentence annotation models to a first sentence not included in the corpus of annotated sentences, to generate a plurality of sentence annotations, each of the plurality of sentence annotations resulting from application of one of the plurality of sentence annotation models to the first sentence, each of the plurality of sentence annotations comprising a parse tree that includes a set of tags, labels, and/or connections for words of the first sentence; and
comparing the plurality of sentence annotations to select a best sentence annotation for the first sentence from among the plurality of sentence annotations, wherein the comparing comprises:
sending the parse tree resulting from application of each of the plurality of sentence annotation models to a rover;
determining in the rover a best set of tags, labels, and/or connections for the first sentence based on a comparison of the sets of tags, labels, and/or connections resulting from application of the plurality of sentence annotation models;
annotating words of the first sentence using the best set of tags, labels, and/or connections; and
tagging the best set of tags, labels, and/or connections as reliable or unreliable.

16. The data processing system of claim 15, wherein the corpus comprises sentences annotated by a human annotator using an annotation tool.

17. The data processing system of claim 15, wherein the determining comprises:
determining whether the plurality of sentence annotation models agree on a same parse tree; and
if any of the plurality of sentence annotation models agree on the same parse tree, selecting the set of tags, labels, and/or connections resulting from application of one of the agreed sentence annotation models as the best set of tags, labels, and/or connections.

18. The data processing system of claim 17, wherein the determining further comprises:
if none of the plurality of sentence annotation models agree on a same parse tree, selecting a set of tags, labels and/or connections resulting from application of a support vector machines model as the best set of tags, labels, and/or connections.

19. The data processing system of claim 15, wherein the method further comprises:
adding the best sentence annotation in association with the first sentence to a set of training data that includes sentences annotated by a human annotator; and
annotating a second sentence using the set of training data.

20. The data processing system of claim 19, wherein the method further comprises:
automatically annotating each sentence of subsequent corpuses using set of training data that includes correctly annotated sentences from at least one previous round of annotation.

21. A computer program product comprising at least one recordable-type computer-readable medium encoded with a plurality of computer-executable instructions that, when executed, perform a method comprising:
training a plurality of sentence annotation models on a corpus of annotated sentences, wherein each sentence annotation model of the plurality of sentence annotation models uses a different sentence annotation algorithm;
applying each of the plurality of sentence annotation models to a first sentence not included in the corpus of annotated sentences, to generate a plurality of sentence annotations, each of the plurality of sentence annotations resulting from application of one of the plurality of sentence annotation models to the first sentence, each of the plurality of sentence annotations comprising a parse tree that includes a set of tags, labels, and/or connections for words of the first sentence; and
comparing the plurality of sentence annotations to select a best sentence annotation for the first sentence from among the plurality of sentence annotations, wherein the comparing comprises:
sending the parse tree resulting from application of each of the plurality of sentence annotation models to a rover;
determining in the rover a best set of tags, labels, and/or connections for the first sentence based on a comparison of the sets of tags, labels, and/or connections resulting from application of the plurality of sentence annotation models;
annotating words of the first sentence using the best set of tags, labels, and/or connections; and
tagging the best set of tags, labels, and/or connections as reliable or unreliable.

22. The computer program product of claim 21, wherein the corpus comprises sentences annotated by a human annotator using an annotation tool.

23. The computer program product of claim 21, wherein the determining comprises:
- determining whether any of the plurality of sentence annotation models agree on a same parse tree; and
- if any of the plurality of sentence annotation models agree on the same parse tree, selecting the set of tags, labels, and/or connections resulting from application of one of the agreed sentence annotation models as the best set of tags, labels, and/or connections.

24. The computer program product of claim 23, wherein the determining further comprises:
- if none of the plurality of sentence annotation models agree on a same parse tree, selecting a set of tags, labels and/or connections resulting from application of a support vector machines model as the best set of tags, labels, and/or connections.

25. The computer program product of claim 21, wherein the method further comprises:
- adding the best sentence annotation in association with the first sentence to a set of training data that includes sentences annotated by a human annotator; and
- annotating a second sentence using the set of training data.

26. The computer program product of claim 25, wherein the method further comprises:
- automatically annotating each sentence of subsequent corpuses using a set of training data that includes correctly annotated sentences from at least one previous round of annotation.

* * * * *

UNITED STATES PATENT AND TRADEMARK OFFICE
CERTIFICATE OF CORRECTION

PATENT NO. : 7,996,211 B2  Page 1 of 1
APPLICATION NO. : 12/123778
DATED : August 9, 2011
INVENTOR(S) : Yuqing Gao et al.

It is certified that error appears in the above-identified patent and that said Letters Patent is hereby corrected as shown below:

\*\*In the Claims

At column 14, line 32, after the word "using", please insert the word --a--.\*\*

Signed and Sealed this
Twentieth Day of September, 2011

David J. Kappos
*Director of the United States Patent and Trademark Office*